Nov. 10, 1959  D. E. BERGGREN  2,912,588
DEVICE FOR MANUFACTURING X-RAY PHOTOGRAPHS
Filed March 6, 1957  2 Sheets-Sheet 1

INVENTOR
DETLOF EMANUEL BERGGREN
BY
AGENT

Nov. 10, 1959　　　D. E. BERGGREN　　　2,912,588
DEVICE FOR MANUFACTURING X-RAY PHOTOGRAPHS
Filed March 6, 1957　　　　　　　　　　2 Sheets-Sheet 2

INVENTOR
DETLOF EMANUEL BERGGREN
BY
AGENT

United States Patent Office 2,912,588
Patented Nov. 10, 1959

2,912,588

DEVICE FOR MANUFACTURING X-RAY PHOTOGRAPHS

Detlof Emanuel Berggren, Eindhoven, Netherlands, assignor to North American Philips Company, Inc., New York, N.Y., a corporation of Delaware Application March 6, 1957, Serial No. 644,413

Claims priority, application Netherlands March 6, 1956

8 Claims. (Cl. 250—66)

Devices for manufacturing X-ray photographs on a photographic plate or film may be of a kind such that the photograph is taken after the object to be photographed has been made visible on a fluorescent screen. This is important more particularly in photographing certain moments in the phase of movement of human organs, for example of the stomach intestine peristaltic movement. In such an examination it is frequently desirable to make several photographs with short intervals.

Replacement of the exposed photographic plate or film takes up too much time. On a film of normal size for direct photography several photographs are thus taken side by side or in two superjacent series.

It is common practice to move the holder for the image-carrier back into its rest position between two exposures. In this case the photographic material lies wholly outside the effective beam of X-rays and in this position the image may be inspected by means of the fluorescent screen without the photographic material being struck by rays. In manufacturing the photographs, the holder is moved each time from its rest position to each of the photographing positions.

It is known to adjust the distance through which the holder is to be displaced by means of adjustable stops. The stops are made operative one after another, so that after each exposure the adjustment for the subsequent exposure is different. To prevent the holder from stopping with a shock and thus to avoid vibration of the device, provision has been made of shock dampers.

In order to avoid such unwanted phenomena, which may be comparatively violent since because of a minimum led lapse of time between the exposure and the photograph the holder is displaced rapidly, use has in certain cases been made of a device comprising a rotary crank, the free extremity of which is coupled with the holder. The speed of displacement with constant rotational speed of the crank decreases more and more as the holder approaches the position it has to occupy and the crank points in the direction of the movement of the holder. This is possible only when the photographic plate or film must invariably be moved into the same position. Consequently with this device the disadvantage remains that the holder cannot be stopped without unwanted shocks in all the positions required for taking a photograph.

The number of photographs to be manufactured on an image layer may be greatly different. The devices suitable for practice are in most cases so designed that 2, 3, 4, or 6 photographs may be arranged on the image layer. The means used for moving the image layer invariably into the correct position render such a device complicated and expensive.

The object of the invention is to avoid said disadvantages and provide a considerable simplification. It relates to a device for successively manufacturing two or more X-ray images side by side on a photographic plate or film, the image carrier being arranged in a holder which, after each exposure, is moved by means of a driving mechanism into a rest position and subsequently into each of the photographing positions. According to the invention, the driving mechanism comprises two relatively rotatable parts, of which one drives the holder for the image carrier and the other is coupled with the holder and can rotate about a shaft, provided between the two parts, at half the speed of the first part, thus varying the displacement of the holder brought about by this part. The device is furthermore such that the two parts may be rigidly connected together by means of a locking device.

In order that the invention may be readily carried into effect, several embodiments will now be described, by way of example, with reference to the accompanying drawings, in which.

Figure 3:
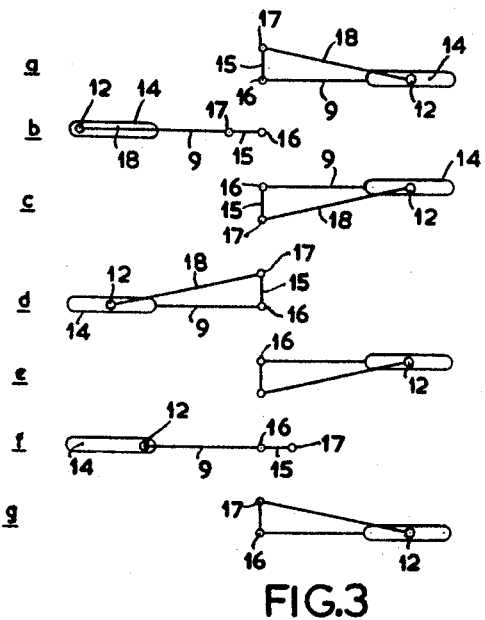

Fig. 3 serves to clarify the adjustment of the holder for the image layer.

Figure 4:
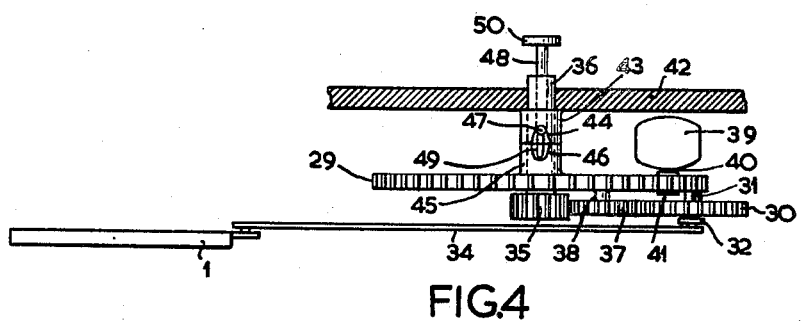
Figure 5:
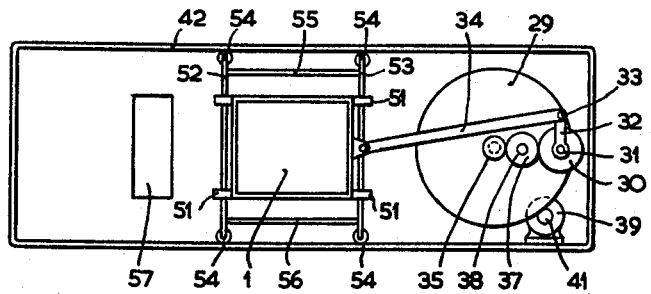
Figure 6:
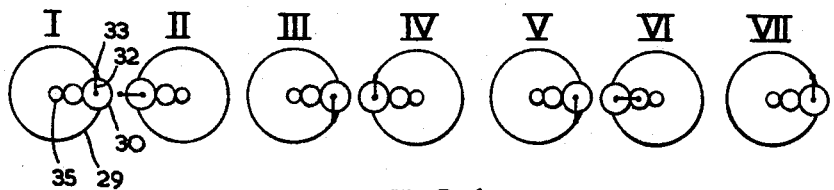

Fig. 4 shows another embodiment of the device according to the invention, in which Fig. 5 shows a combination with the adjustable holder in a housing, and Fig. 6 is a diagrammatic illustration which clarifies the adjustments of the holder for the image layer which are possible by means of said device.

Figure 1:
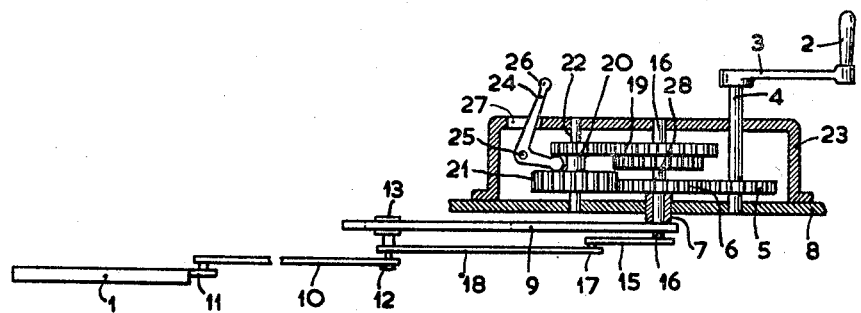
Fig. 1 shows one embodiment of the driving mechanism, in which the part for the displacement and the part for the adjustment of the holder for the image layer have a common shaft.
Figure 2:
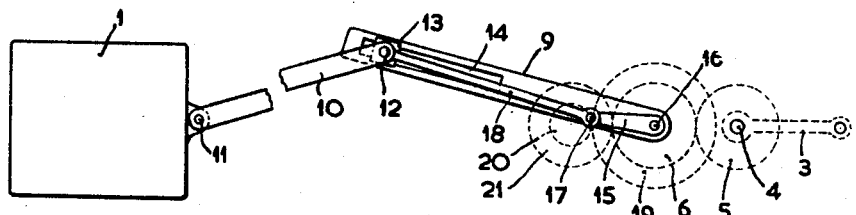
Fig. 2 shows another view of the same device.

A holder 1 for the photographic plate or film is displaced by means of the driving mechanism shown in Figs. 1 and 2 by rotating a crank 3 by means of a handle 2. This movement is transferred via a shaft 4 and a gear wheel 5 to a gear wheel 6, which is rigidly connected to a hollow shaft 7. The latter extends through a wall 8 of a housing, in which the holder 1 is movably arranged, and carries on its projecting extremity an arm 9 for driving the holder 1. The connection with the holder 1 is effected by means of a coupling rod 10. The latter is connected to a center of rotation 11 of the holder and, at its other extremity, to a pin 12 provided on a slide 13. The latter is slidably arranged in a slot 14 of the arm 9.

The displacement of the slide 13 is adjusted by means of a short arm 15, which can rotate about a shaft 16 and is rigidly connected thereto. The free extremity of the arm 15 is connected at the centre of rotation 17 by means of a driving rod 18 to the pin 12 and hence to the slide 13.

A gear wheel 19 is rigidly connected to the shaft 16, which can rotate freely in the hollow shaft 7. Arranged between the gear wheel 19 and the wheel 6 on the hollow shaft 7 is a coupling constituted by gear wheels 20 and 21, which together are seated on a shaft 22. The gear wheel 20 has a diameter half that of the gear wheel 21, so that upon rotation of the crank 3 the arm 15 rotates in the same direction as the arm 9, but at half its speed. The space in which the gear wheels are housed is shut off by means of a cover 23 which at the same time serves to support the various shafts. The crank 3 is provided externally of the housing.

Inside the space a lever 24 is rotatably arranged on a shaft 25, having an operating knob 26 projecting to the exterior through an aperture 27 of the cover 23. The other extremity of the lever reaches between the two gear wheels 20 and 21, which can slide along the shaft 22 and by displacing the knob 26 of lever 24 to the left the gear wheels 20 and 21 slide upwards, so that the connection between the gear wheels 20 and 19 is interrupted and the gear wheel 21 is coupled not only with the gear wheel 6, but also with the gear wheel 28, which is of the same diameter as gear wheel 6 and integral with the gear wheel 19. The gear wheels 6 and 19 are thus rigidly connected together, as well as the arms 9 and 15, which rotate at the same speed when the crank 3 is rotated.

Fig. 3 shows diagrammatically the different positions of the arms 9 and 15 for the rest positions and for the photographing positions of the holder 1, the holder not being shown, but instead the point 12 to which it is connected by means of the coupling rod 10. The position of this point on the arm 9 determines the position of the holder.

In the positions shown, the operating positions are those in which the point 12 lies at the left of the center of rotation 16. In the rest position, this point lies at the right of the center of rotation 16. The different parts of the system are otherwise indicated by the same reference numerals as in Figs. 1 and 2.

The rest position and also the initial position for a series of exposures is indicated by *a*. The arm 9 with the slot 14 has a horizontal position and the arm 15 is directed vertically upwards. The driving rod 18 is located between point 17 on this arm and point 12.

By rotating the crank 3, the arm 9 rotates about the center of rotation 16 and assumes at *b* the horizontal position directed to the left. The lever 26 is directed to the right. The arm 15 has rotated through only 90° after the arm 9 has rotated through half a revolution. Both arms now point in the same direction and the slide with the point 12 has been displaced to the left in the slot 14. The holder 1 then occupies the extreme left-hand position.

After a subsequent half revolution, the arm 9 is again horizontally directed to the right and the situation is as shown at *a*, except that the arm 15, which again has rotated by a quarter of a revolution, is directed vertically downwards.

For the subsequent displacement of the holder 1, the lever 26 is changed-over to the left. In this case, the arms 9 and 13 are rigidly connected together and when the arm 9 is rotated into the position *d*, this movement is followed by the arm 15. During this rotational movement, the position of point 12 in the slot 14 is not varied and the holder occupies an intermediate position.

After the exposure, the arm 9 is rotated further into its rest position *e*, which fully corresponds to the rest position in *c*.

Subsequently, the lever 26 is again changed over to the right and in the next stage the arm 9 is again rotated to the right. The arm 15 now again moves at half the speed and is located in line with the arm 9, the point 12 in the slot 14 thus being wholly displaced to the right.

By continuing the rotation of arm 9 subsequent to the exposure, the situation in *g* is similar as in *a* and the cycle of exposure may start again.

In this manner the holder for the photographic plate or film may be adjusted to three different positions and it is possible to manufacture on the image carrier three photographs in juxtaposition, the holder always stopping without shocks, since in each case the forward speed in the direction of the displacement of the holder has been reduced to zero.

In the embodiment of the driving mechanism shown in Figs. 4 and 5, the holder 1 for the image layer is driven by a circular disc 29, which has eccentrically secured to it a gear wheel 30 which is rotatable about a shaft 31. An arm 32 is rigidly secured to the disc 29 and thus likewise rotatable about the shaft 31. The free extremity of the arm 32 transfers the movement of the disc 29 to the holder 1. This is effected by means of a coupling rod 34, which is connected to a center of rotation 33 on the arm 32 and to the holder 1. The connection between the arm 32 and the holder 1 may alternatively be established in a different manner.

A gear wheel 35 is positioned at the center of the disc 29. The gear wheel 35 and the disc 29 are carried by the same shaft 36, the gear wheel being rigidly connected therewith and the disc being rotatable with respect to this shaft. The gear wheel 35 has a diameter half that of the gear wheel 30. Between the two gear wheels, a coupling gear wheel 37 on a shaft 38 is secured to the disc 29. The disc 29 may be rotated by means of an electric motor 39 via a gear wheel 41 seated on the motor shaft 40.

Furthermore, use is made of a mechanism which permits the gear wheel 35 to be coupled with the housing containing the driving mechanism, so that the gear wheel cannot rotate, or permits the gear wheel 35 to be coupled with the disc 29, so that the gear wheel follows the rotation of this disc. The wall of the housing is indicated by 42 and has secured to it a sleeve 43 in which the shaft 36 is journalled, the sleeve having a slot 44.

Likewise secured to the disc 29 is a sleeve 45 having a corresponding slot 46. A cam 47 can slide along the shaft 36 from one slot 44 into the other 46. For this purpose, the shaft 36 has a bore in which a pin 48 can be moved to and from, and connected to this pin is a cam 47 which projects to the exterior through a slot 44 of the shaft 36. The pin may be displaced by means of a knob 50. In the retracted position of the knob 50 the shaft 36 of the gear wheel 35 is coupled with the fixed sleeve 43, which forms part of the wall 42, and in the depressed position the cam 47 connects the shaft 36 to the sleeve 45 which is integral with the disc 29.

The holder for the photographic plate or film is shown in the rest position. It is suspended by means of cams 51 in a frame, of which vertical posts 52 and 53 have rollers 54 at their upper and lower ends, by means of which the frame bears against the housing 42 and can be readily displaced. The vertical posts are connected together by means of transverse posts 55 and 56 so that a rigid assembly is obtained. 57 indicates the aperture to allow passage of the X-rays. The wall in the vicinity of the aperture may be covered with lead plates for intercepting unwanted rays. If desired, the aperture may be made larger or smaller by displacing the lead plates. In the shape and size as shown the aperture is suitable for taking three photographs side by side on the image carrier in the holder 1. The displacements of holder 1 required therefor appear from Fig. 6, which shows diagrammatically the different positions of the driving mechanism.

From the first diagram, the rest position may be readily recognized. When the disc 29 is rotated by the electric motor, then after half a revolution the situation arises as shown in diagram II. It is assumed that the gear wheel 35 is coupled with the housing and hence does not follow the rotation of the disc 29. Consequently, the gear wheel 30 rotates in the clockwise direction and the arm 32 swings to the exterior. After half a revolution of the disc 29, the arm 32 has rotated exactly 90° with respect to the disc and is in line with the line connecting its center of rotation and the axis of the disc. The holder 1 occupies the extreme left-hand photographing position.

After the disc 29 has again rotated half a revolution in the same sense, the situation arises as indicated by III, in which the holder 1 occupies the rest position and the arm 32 is directed vertically downwards.

IV indicates the intermediate position for taking the photographs, which position arises after the knob 50 has been depressed and the gear wheel 35 has been rigidly connected to the disc 29 by means of cam 47. In this position, the disc 29 has again rotated half a revolution, but the position of the arm 32 has not changed.

When the rotation of disc 29 is continued, the situation occurring in V is similar as in III.

Subsequently, the knob 50 is drawn to the exterior so that upon rotation of the disc 29 the gear wheel 35 does not follow its movement. In this case, when the disc 29 has again rotated half a revolution, the arm 32 is directed towards the center of the disc and the holder 1 occupies the position for the third exposure.

Subsequently, when the rotation of disc 29 is continued, the mechanism again occupies the initial position.

Instead of taking three photographs on the image layer, it is also possible to manufacture two photographs side by side by omitting the positions IV and V, hence the gear wheel 35 is invariably connected to the housing.

More than three photographs may be manufactured on the image layer by displacing the holder 1 downwards at the beginning of a series of three photographs and, after this series of photographs has been taken, sliding the holder upwards along the vertical posts 52 and 53 for manufacturing another series of three photographs.

In a similar manner it is possible to manufacture four photographs on the image layer.

What is claimed is:

1. A sequential exposure device for X-ray photography of at least two images side-by-side on a photographic plate comprising a holder, an image carrier mounted on said holder, a motion mechanism for moving said holder into rest position and subsequently in each of the sequential photographing positions, said motion mechanism including a shaft, two relatively rotatable parts mounted on said shaft, a pivot mounted on said shaft, one of said parts rotating about said shaft and driving said holder, the other of said parts being coupled with said holder and rotatable about said pivot at one-half the speed of rotation of said one part thereby varying the displacement of said holder brought about by said part.

2. A sequential exposure device for X-ray photography as claimed in claim 1 further comprising a locking device for rigidly connecting said two parts together.

3. A sequential exposure device for X-ray photography as claimed in claim 1 wherein said two parts rotate about a common axis of rotation.

4. A sequential exposure device for X-ray photography as claimed in claim 1 further comprising a driving shaft spaced laterally from said shaft mounting the two rotatable parts.

5. A sequential exposure device for X-ray photography of at least two images side-by-side on a photographic plate comprising a holder, an image carrier mounted on said holder, a motion mechanism for moving said holder into rest position and subsequently in each of the sequential photographing positions, said motion mechanism including a shaft, two relatively rotatable parts mounted on said shaft, a pivot mounted on said shaft, one of said parts rotating about said shaft and driving said holder, the other of said parts being coupled with said holder and rotatable about said pivot at one-half the speed of rotation of said one part thereby varying the displacement of said holder brought about by said part and a lever rotatable about said shaft, a first arm, a slide operatively connected to said holder and slidable in the direction of said shaft, a second arm rotatable about said shaft, means coupling said slide to said second arm whereby the difference in the rotational speed between the two arms results in the movement of said slide along said first arm.

6. A sequential exposure device for X-ray photography as claimed in claim 5 further comprising a locking device including an auxiliary shaft parallel to said shaft, a gear wheel slidable mounted on said auxiliary shaft, two other gear wheels on said shaft operatively connected to said first and second arms respectively whereby when said gear wheel slides along said shaft in a predetermined direction said gear wheel meshes with said two other gear wheels.

7. A sequential exposure device for X-ray photography as claimed in claim 1 wherein said motion mechanism comprises a main shaft, a rotary disc on said main shaft, an auxiliary shaft, an arm rigidly connected to said rotary disc and rotatably mounted on said auxiliary shaft, means coupling said arm with said holder, a first gear wheel provided co-axially of said rotary disc on said main shaft, a second gear wheel rotatably mounted on said auxiliary shaft, and means operatively connecting said first and second gear wheels.

8. A sequential exposure device for X-ray photography as claimed in claim 7 further comprising means whereby said first gear wheel is coupled with either the housing or the rotary disc.

References Cited in the file of this patent

UNITED STATES PATENTS

| | | |
|---|---|---|
| 2,652,498 | Snook et al. | Sept. 15, 1953 |
| 2,709,221 | Haupt et al. | May 24, 1955 |
| 2,749,445 | Stava et al. | June 5, 1956 |